United States Patent
Yang

(10) Patent No.: US 10,924,650 B2
(45) Date of Patent: Feb. 16, 2021

(54) SELFIE CAPTURING DEVICE OF PORTABLE MOBILE COMMUNICATION TERMINAL AND CONTROL METHOD THEREFOR

(71) Applicant: Kyung-Ho Yang, Seoul (KR)

(72) Inventor: Kyung-Ho Yang, Seoul (KR)

(*) Notice: Subject to any disclaimer, the term of this patent is extended or adjusted under 35 U.S.C. 154(b) by 0 days.

(21) Appl. No.: 16/652,461

(22) PCT Filed: Apr. 10, 2019

(86) PCT No.: PCT/KR2019/004284
§ 371 (c)(1),
(2) Date: Mar. 31, 2020

(87) PCT Pub. No.: WO2019/245141
PCT Pub. Date: Dec. 26, 2019

(65) Prior Publication Data
US 2020/0236260 A1 Jul. 23, 2020

(30) Foreign Application Priority Data
Jun. 18, 2018 (KR) .................. 10-2018-0069545

(51) Int. Cl.
*H04M 1/02* (2006.01)
*H04N 5/225* (2006.01)

(52) U.S. Cl.
CPC ........ *H04N 5/2257* (2013.01); *H04M 1/0264* (2013.01); *H04M 2201/38* (2013.01)

(58) Field of Classification Search
CPC ........ H04N 5/225; H04N 2/2257; H04B 1/38; H04B 1/40; H04M 1/00; H04M 1/02; H04M 1/0264; H04M 1/0266; H04M 1/725; G02F 1/1333
See application file for complete search history.

(56) References Cited

U.S. PATENT DOCUMENTS

| | | | | |
|---|---|---|---|---|
| 2006/0140621 | A1* | 6/2006 | Misawa | G03B 17/20 396/374 |
| 2009/0102763 | A1* | 4/2009 | Border | H04N 7/144 345/87 |
| 2014/0049667 | A1* | 2/2014 | Robinson | H04N 5/2251 348/262 |
| 2014/0184521 | A1* | 7/2014 | Kwong | G03B 17/12 345/173 |

(Continued)

FOREIGN PATENT DOCUMENTS

| | | |
|---|---|---|
| JP | 2012-070356 A | 4/2012 |
| KR | 10-2007-0087904 A | 8/2007 |

(Continued)

OTHER PUBLICATIONS

International Search Report for PCT/KR2019/004284 dated Jul. 26, 2019 from Korean Intellectual Property Office.

*Primary Examiner* — Thanh C Le
(74) *Attorney, Agent, or Firm* — Paratas Law Group, PLLC

(57) ABSTRACT

Disclosed is a self-portrait photographing device for a portable mobile communication terminal, including: a self-camera module which is installed within a screen area of a display panel, through which an image is output, and captures an image of a subject through a front surface of the display panel; and a controller configured to control operations of the self-camera module and the display panel.

2 Claims, 4 Drawing Sheets

(56) References Cited

U.S. PATENT DOCUMENTS

2020/0244854 A1* 7/2020 Lee ..................... H04N 5/2259

FOREIGN PATENT DOCUMENTS

| KR | 10-2010-0088680 A | 8/2010 |
| KR | 10-2015-0000293 A | 1/2015 |
| KR | 10-2017-0118985 A | 10/2017 |
| KR | 10-2018-0044200 A | 5/2018 |

* cited by examiner

SELFIE CAPTURING DEVICE OF PORTABLE MOBILE COMMUNICATION TERMINAL AND CONTROL METHOD THEREFOR

CROSS-REFERENCE TO PRIOR APPLICATION

This application is a National Stage Patent Application of PCT International Patent Application No. PCT/KR2019/004284 (filed on Apr. 10, 2019) under 35 U.S.C. § 371, which claims priority to Korean Patent Application No. 10-2018-0069545 (filed on Jun. 18, 2018), which are all hereby incorporated by reference in their entirety.

BACKGROUND

The present disclosure relates to a portable mobile communication terminal, and more specifically, to a self-portrait photographing device for a portable mobile communication terminal, in which an image sensor and a lens for capturing a self-portrait photograph (a so-called "selfie") are arranged within an image display area of a display panel for outputting a screen to thereby remove a mismatch between a line of sight and the lens, and a method of controlling the same.

A general portable mobile communication terminal, a so-called "smartphone," is provided with a camera module and a flash so that a subject is photographed with the camera module while being illuminated with the flash to obtain a still image or moving image of the subject.

Typically, a self-portrait photographing device for a portable mobile communication terminal is positioned at a front upper end of the terminal and is positioned on the left or right side of the front upper end by manufacturers or models, and thus is separated from a display (a screen).

Accordingly, when capturing a self-portrait photograph, a user needs to select one of the screen and the camera to look at. In addition, when the user views the screen to check an image being captured or the screen, downward-facing photography takes place because the camera is positioned above the screen, making the user appear to close his/her eyes rather than look forward.

In addition, while looking at the camera, the user cannot view the image being captured or the screen accurately. As such, self-portrait photography generally causes a user difficulty in capturing an image while looking at the screen and requires empirical photography or several instances of photographing attempts.

As a related art, Korean Patent Publication No. 10-2017-0118985 discloses a mobile communication terminal, in which a pose checking mirror having a through hole for a camera is attached to a rear surface of the mobile communication terminal (a rear cover or back cover of a terminal body or a protective cover coupled to a rear surface of the terminal body) and a photographer may perform capturing using a rear camera of the mobile communication terminal seen through the through hole for the camera with his or her eyes kept on the camera while naturally viewing an image being captured or a screen through the mirror.

However, in the self-portrait photography method performed by a camera lens and a mirror attached to the rear surface of the mobile communication terminal, the photographer has a difficulty in touching a button to take a picture, which is displayed on the screen, and thus screen movement often occurs. In addition, due to a battery disposed in the rear of the terminal, a space for installing a camera module for self-portrait photography in the terminal is removed so that the camera module needs to be installed outside the terminal, which causes the overall thickness of the terminal to be significantly increased.

SUMMARY

The present disclosure is directed to providing a self-portrait photographing device for a portable mobile communication terminal, in which an image sensor and a lens for self-portrait photography are arranged within an image display area of a display panel on which an image is displayed to thereby remove a mismatch between a line of sight of a photographer and the lens during the self-portrait photography, and a method of controlling the same.

The present disclosure is directed to providing a self-portrait photographing device for a portable mobile communication terminal which allows an eyelid closure phenomenon and unnatural poses caused by a mismatch between a line of sight of a photographer and a lens to be prevented even when the photographer performs self-portrait photography while checking a screen displayed on a display panel, and a method of controlling the same.

One aspect of the present disclosure provides a self-portrait photographing device for a portable mobile communication terminal including a self-camera module which is installed within a screen area of a display panel, through which an image is output, and captures an image of a subject through a front surface of the display panel, and a controller configured to control operations of the self-camera module and the display panel.

The controller may control the operation of the display panel so that an image signal is not input only into an area of the screen area of the display panel corresponding to the self-camera module in a photography operation through the self-camera module.

An area of the display panel corresponding to the self-camera module may be formed to be transparent.

In addition, an area of the display panel corresponding to the self-camera module may be formed with a space into which a lens of the self-camera module is inserted.

The self-camera module may include a lens installed on the rear of the display panel within the screen area of the display panel and an image sensor installed on a rear surface of the lens.

Another aspect of the present disclosure provides a method of controlling a self-portrait photographing device for a portable mobile communication terminal including (a) applying a control signal to a self-camera module to capture an image of a subject and (b) outputting the captured image through a display panel.

Another aspect of the present disclosure provides a method of controlling a self-portrait photographing device for a portable mobile communication terminal including (a) controlling an operation of a display panel so that an image signal is not input only into an area of a screen area of the display panel corresponding to a self-camera module and (b) capturing an image of a subject using the self-camera module and outputting the image on a remaining area in the screen area of the display panel except for the area corresponding to the self-camera module.

When the self-camera module is arranged within the screen area of the display panel of the portable mobile communication terminal, the photographer may perform the self-portrait photography while viewing an image displayed on the display panel with his or her eyes kept on the self-camera module within the screen so that eyelid closure due to a mismatch in a line of sight of the photographer can be prevented from occurring and a self-portrait photograph with a natural pose can be acquired.

The self-portrait photographing device for the portable mobile communication terminal according to the present disclosure can be equally or similarly applied to not only a portable mobile communication terminal but also any application having a display panel and a self-portrait photography camera, such as a monitor of a laptop computer referred to as "a notebook computer," a monitor of a desktop computer, a television, and the like.

DETAILED DESCRIPTION

Embodiments set forth herein and illustrated in the configuration of the present disclosure are only the most preferred embodiments and are not representative of the present disclosure, so it should be understood that they may be replaced with various equivalents and modifications at the time of the disclosure.

Hereinafter, a self-portrait photographing device for a portable mobile communication terminal and a method of controlling the same will be described with reference to the accompanying drawings in detail.

Figure 1:
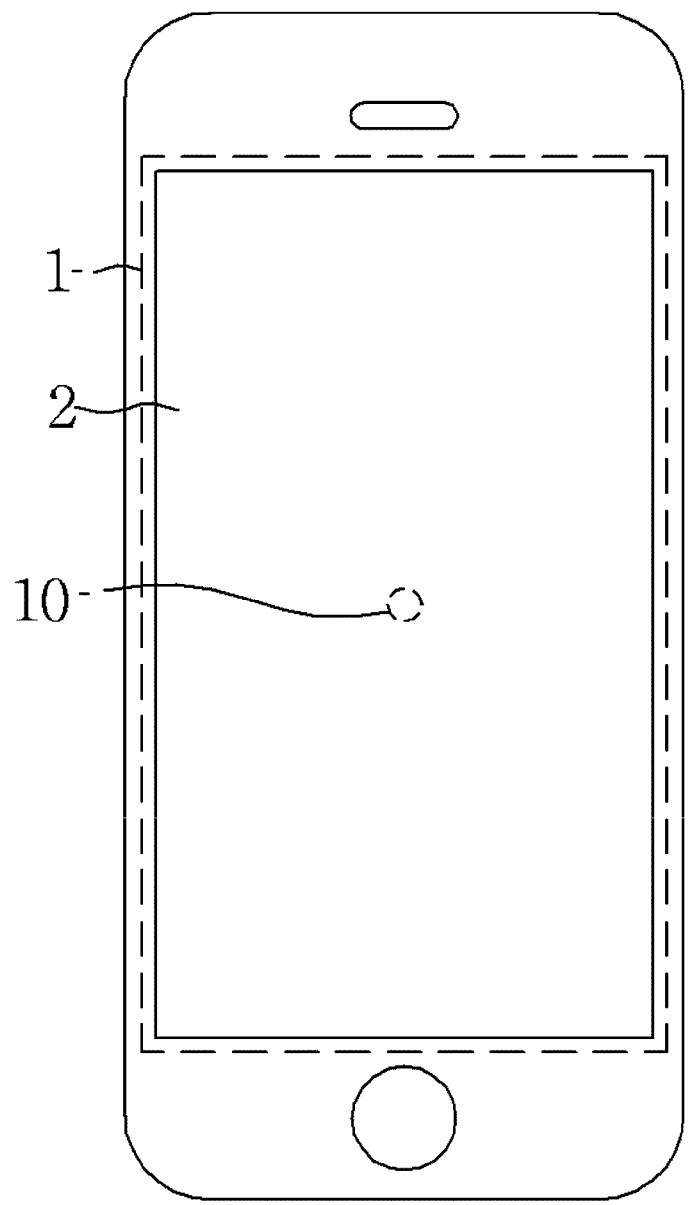
FIG. 1 is a front view illustrating a portable mobile communication terminal to which a self-portrait photographing device according to the present disclosure is applied.
Figure 2:
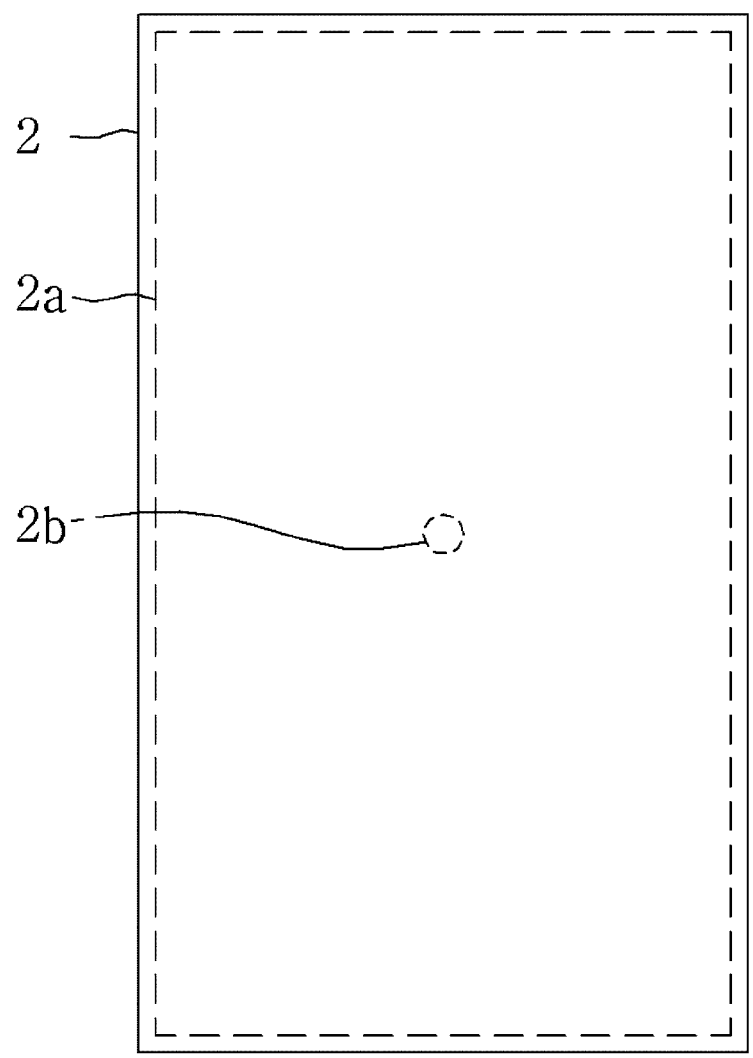
FIG. 2 is a front view illustrating a display panel of the portable mobile communication terminal shown in FIG. 1.
Figure 3:
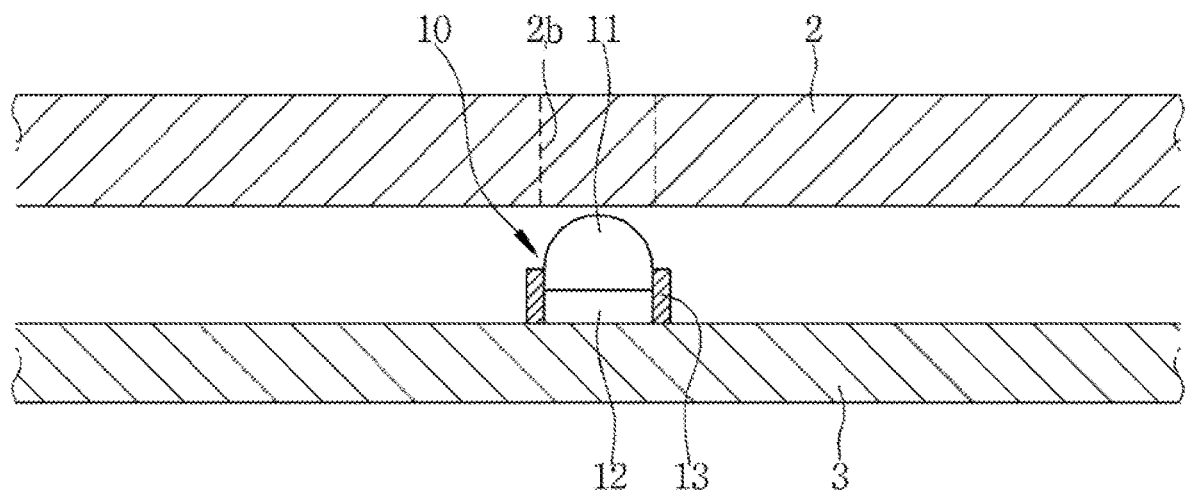
FIG. 3 is a sectional view illustrating main parts of a self-portrait photographing device according to an embodiment.

Referring to FIGS. 1 and 2, a portable mobile communication terminal includes a case 1 having a substantially rectangular parallelepiped shape, a display panel 2 installed in front of the case 1 and outputting an image in a forward direction, a printed circuit board (PCB) 3 installed on a rear surface of the display panel 2 in the case 1, and a battery (not shown) supplying power for the operation of various electrical components of the display panel 2 and the PCB 3.

The display panel 2 may be provided using a liquid crystal display (LCD), an organic light emitting diode (OLED), or the like. In addition, various electronic components, such as a self-camera module 10 and a controller constituting the self-portrait photographing device according to the present disclosure, a microphone, a speaker, a central processing unit (CPU), a read only memory (ROM), a random-access memory (RAM), an input/output (I/O) chip, and the like, are installed on the PCB 3.

The self-portrait photographing device according to the embodiment of the present disclosure includes the self-camera module 10 installed within a screen area 2a of the display panel 2 and configured to capture an image of a subject through a front surface of the display panel 2, and the controller (not shown) configured to control operations of the self-camera module 10 and the display panel 2.

The self-camera module 10 includes a lens 11 installed on the rear of the display panel 2 within the screen area 2a of the display panel 2, and an image sensor 12 installed on a rear surface of the lens 11. The lens 11 and the image sensor 12 are inserted into a camera holder 13 to be supported thereby. The self-camera module 10 is installed on the PCB 3, and the operation of the self-camera module is controlled by the controller.

The self-camera module 10 is preferably disposed at approximately the center of the screen area 2a of the display panel 2. For example, the self-camera module 10 may be disposed at a point at which two diagonal lines of the screen area 2a cross each other. In addition, the self-camera module 10 may be installed at an arbitrary position in the screen area of the display panel 2, for example, the self-camera module 10 may also be installed at an edge or corner portion in the screen area of the display panel 2.

The controller is installed on the PCB 3 and is configured to transmit an image signal to the display panel 2 and control the operation of the image sensor 12 of the self-camera module 10.

The self-camera module 10 is present within the screen area 2a of the display panel 2, but since light passes through the display panel 2, image capturing of a subject by the self-camera module 10 is performable even while an image is being output through the display panel 2.

In order for external light to more effectively pass through the display panel 2 when the self-portrait photography by the self-camera mode 10 is performed, an area 2b of the display panel 2 in which the lens 11 of the self-camera module 10 is located may be formed to be transparent when an image is output through the display panel 2. To this end, the controller may control the operation of the display panel 2 so that image signals are transmitted to pixels of the entire screen area 2a of the display panel 2 in a mode not using the self-camera module 10 to thereby output an image through the entire screen area 2a of the display panel 2, and an image signal is prevented from being input to a pixel of the area 2b corresponding to the self-camera module 10 in a self-portrait photography mode through the self-camera module 10. The pixel in the area 2b of the display panel 2, to which the image signal is prevented from being transmitted by the controller, that is, the pixel in the central area 2b facing the lens 11 of the self-camera module 10, which is not supplied with an image signal, is not activated so as to be kept transparent so that the pixel allows light to transmit to the lens 11 and the image sensor 12, thereby achieving more clear self-portrait photography.

As such, when the self-camera module 10 is disposed within the screen area 2a of the display panel 2 of the portable mobile communication terminal, a photographer may perform the self-portrait photography while viewing an image displayed on the display panel 2 with his or her eyes kept on the self-camera module 10 within the screen so that eyelid closure due to a mismatch in a line of sight of the photographer does not occur and a self-portrait photograph with a natural pose may be acquired.

Figure 4:
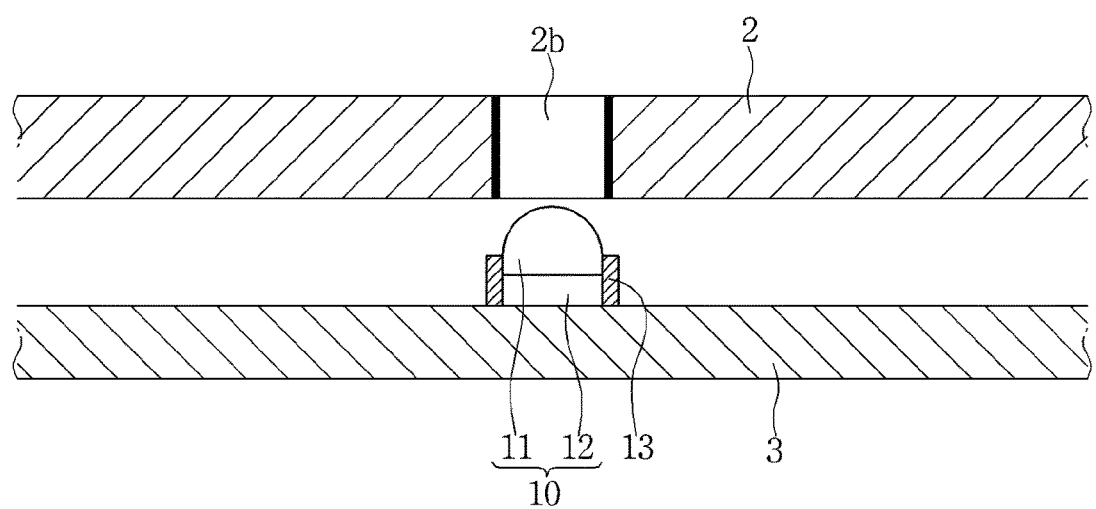
FIG. 4 is a sectional view illustrating main parts of a self-portrait photographing device according to another embodiment.

Meanwhile, in the above-described embodiment, the area 2b in the screen area 2a of the display panel 2 facing the lens 11 of the self-camera module 10 is formed to be transparent by preventing an image signal from being input into the area of the display panel 2 so that the photography by the self-camera module 10 is achieved. However, referring to FIG. 4, a front of the lens 11 may be formed to be transparent by leaving only the area 2b in the screen area 2a of the display panel 2 corresponding to the lens 11 of the self-camera module 10 empty without injecting liquid crystal molecules or light emitting material into the area 2b or by allowing the area 2b to be open.

Figure 5:
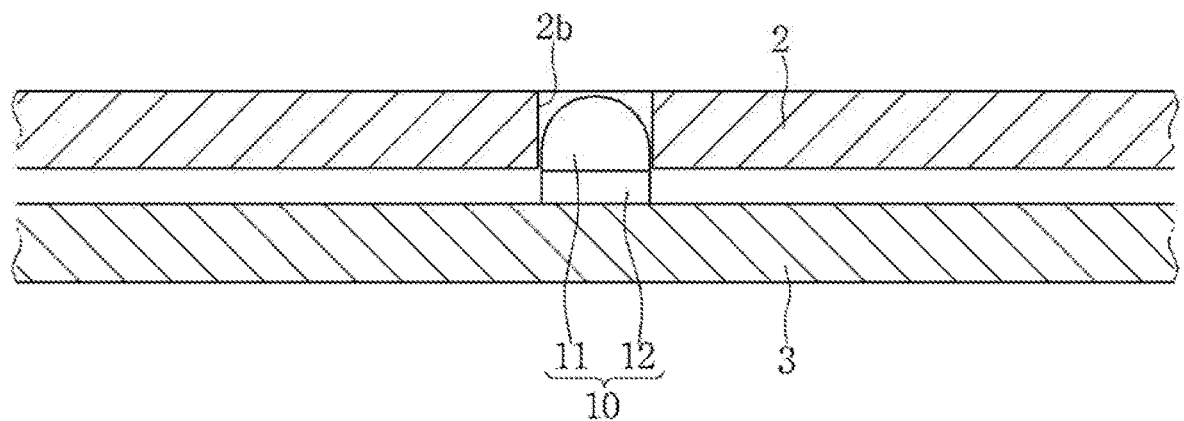
FIG. 5 is a sectional view illustrating main parts of a self-portrait photographing device according to another embodiment.

Alternatively, referring to FIG. 5, the self-camera module 10 may be provided by inserting the lens 11 into the empty space of the area 2b corresponding to the lens 11 of the self-camera module 10.

As such, when the self-camera module 10 is provided by leaving a portion of the screen area 2a of the display panel 2 empty without injecting liquid crystal molecules or light emitting material into the portion or by inserting the lens 11 into the portion, the controller does not need to control the image signal for the area of the display panel 2 corresponding to the self-camera module 10. Whereas, in this case, a screen is not implemented in the empty space in a normal mode except for the self-portrait photography mode, the empty space has a diameter of about 2 mm that is not significantly large in the screen area, and thus is not noticed as a serious defect when viewed from the outside.

Although the exemplary embodiments of the present disclosure have been described for illustrative purposes, those skilled in the art will appreciate that various modifications, additions and substitutions are possible without departing from the scope and spirit of the disclosure, and all modifications and equivalents come within the scope of the appended claims.

The present disclosure is applicable to a self-portrait photographing device of a portable mobile communication terminal, a tablet PC, a display panel, which is used in a monitor of a laptop computer, a monitor of a desktop computer, or a television, an arbitrary application having a self-portrait photography camera, and the like.

The invention claimed is:

1. A self-portrait photographing device for a portable mobile communication terminal, comprising:
   a display panel including:
      a screen area filled with liquid crystal molecules or light emitting material therein and through which an image is output; and
      an empty space provided in the screen area, penetrating a portion of the screen area filled with the liquid crystal molecules or the light emitting material, and having no liquid crystal molecules or light emitting material therein;
   a self-camera module which is installed within the screen area of the display panel and captures an image of a subject through a front surface of the display panel, and including a lens inserted inside the empty space provided in the screen area; and
   a controller configured to control operations of the self-camera module and the display panel.

2. The self-portrait photographing device of claim 1, wherein the self-camera module further includes an image sensor installed on a rear surface of the lens.

* * * * *